US010352542B2

(12) United States Patent
Tsai et al.

(10) Patent No.: US 10,352,542 B2
(45) Date of Patent: Jul. 16, 2019

(54) LED LAMP AND COMPONENT, HEAT DISSIPATING BASE AND LED WIRELESS DIMMING SYSTEM THEREOF

(71) Applicant: Everlight Electronics Co., Ltd., New Taipei (TW)

(72) Inventors: Ming-Chieh Tsai, New Taipei (TW); Hung-Yen Su, New Taipei (TW); Chi-Ming Chen, New Taipei (TW)

(73) Assignee: Everlight Electronics Co., Ltd., New Taipei (TW)

( * ) Notice: Subject to any disclaimer, the term of this patent is extended or adjusted under 35 U.S.C. 154(b) by 0 days.

(21) Appl. No.: 15/869,022

(22) Filed: Jan. 11, 2018

(65) Prior Publication Data

US 2018/0224105 A1 Aug. 9, 2018

Related U.S. Application Data

(60) Provisional application No. 62/445,245, filed on Jan. 12, 2017, provisional application No. 62/458,582, filed on Feb. 14, 2017.

(51) Int. Cl.
*F21V 23/00* (2015.01)
*F21V 29/75* (2015.01)
(Continued)

(52) U.S. Cl.
CPC .............. *F21V 23/005* (2013.01); *F21V 3/00* (2013.01); *F21V 23/0435* (2013.01); *F21V 29/713* (2015.01); *F21V 29/75* (2015.01); *F21V 29/763* (2015.01); *F21V 29/81* (2015.01); *H05B 37/0272* (2013.01); *F21Y 2105/10* (2016.08);
(Continued)

(58) Field of Classification Search
CPC ...... F21V 29/713; F21V 29/763; F21V 29/81; F21V 23/005; F21V 23/0435; F21S 2/005; F21Y 2115/10; H05B 37/0272; H05B 37/029
See application file for complete search history.

(56) References Cited

U.S. PATENT DOCUMENTS

2011/0006688 A1\* 1/2011 Shim ........................ F21V 5/08
315/119
2012/0106152 A1\* 5/2012 Zheng ..................... F21S 2/005
362/249.02
(Continued)

FOREIGN PATENT DOCUMENTS

CN 100480569 C 4/2009
CN 204046890 U 12/2014
(Continued)

*Primary Examiner* — Zheng Song
(74) *Attorney, Agent, or Firm* — Chen Yoshimura LLP (57) ABSTRACT

An LED lamp and a component, a heat dissipating base and an LED wireless dimming system thereof are provided. The LED lamp component comprises a heat dissipating base, a light emitting module and a lens, the heat dissipating base has a bearing surface and a back surface opposite to the bearing surface, the bearing surface is provided with a first recessed section therein, the back surface is provided with heat dissipating structures; the heat dissipating base further comprises a first joint portion; the light emitting module is disposed in the first recessed section, and the lens covering the light emitting module.

16 Claims, 9 Drawing Sheets (51) Int. Cl.
*F21V 3/00* (2015.01)
*F21V 29/81* (2015.01)
*F21V 23/04* (2006.01)
*F21V 29/71* (2015.01)
*F21V 29/76* (2015.01)
*H05B 37/02* (2006.01)
*F21Y 115/10* (2016.01)
*H05B 33/08* (2006.01)
*F21Y 105/10* (2016.01)

(52) U.S. Cl.
CPC ....... *F21Y 2115/10* (2016.08); *H05B 33/0809* (2013.01); *H05B 33/0845* (2013.01)

(56) References Cited

U.S. PATENT DOCUMENTS

| | | | | |
|---|---|---|---|---|
| 2013/0155673 | A1* | 6/2013 | Wang | F21V 5/007 |
| | | | | 362/235 |
| 2015/0120000 | A1* | 4/2015 | Coffey | H04L 12/2803 |
| | | | | 700/13 |
| 2015/0146422 | A1* | 5/2015 | Kwak | F21V 31/005 |
| | | | | 362/235 |
| 2017/0167713 | A1* | 6/2017 | Hong | F21V 29/74 |
| 2018/0116041 | A1* | 4/2018 | Diep | H05B 37/0272 |
| 2019/0003660 | A1* | 1/2019 | Jang | F21V 31/00 |

FOREIGN PATENT DOCUMENTS

| | | |
|---|---|---|
| CN | 103607800 B | 2/2016 |
| TW | M310304 | 9/2006 |

\* cited by examiner

LED LAMP AND COMPONENT, HEAT DISSIPATING BASE AND LED WIRELESS DIMMING SYSTEM THEREOF

BACKGROUND OF THE INVENTION

Field of the Invention

The present invention relates to an LED lamp, and more particularly, it relates to an LED lamp and an extendable component, heat dissipating base and LED wireless dimming system thereof.

Descriptions of the Related Art

As the technology of light emitting diode (LED) lights becomes mature gradually, the LED lights have found wider application in lamps to replace conventional light sources. Forms of LED light sources (e.g., light emitting modules) vary greatly in various different types of lamps. For example, a light source of a small area is used in a down lamp, a light source of a slightly larger area is used in a street lamp, and a light source of a much larger area is used in a sport ground. Shapes of the light sources may also change depending on the types of the lamps, e.g., the light sources may have a shape of circle, square, rectangle, strip or the like. If light emitting modules and housings of specific shapes and areas are custom-made for each of various types of lamps, the complexity and the cost of the production will be increased remarkably.

Additionally, attention should also be paid to volumes of the lamps. Most of LED wireless dimming systems currently available are driving circuits based on switch circuits. Most of the driving circuits based on switch circuits make use of inductors or transformers, and the volume of the inductors are larger than that of other electronic elements, so the volume of the overall circuit assembly cannot be reduced. Moreover, high frequency characteristics of the switch circuits tend to cause a problem of electromagnetic interference (EMI), which influences the operational stability of wireless modules. Traditionally, a combination of a resistor, a capacitor and an inductor is used as an EMI suppression circuit. However, these elements also make it impossible to reduce the volume of the overall circuit assembly.

SUMMARY OF THE INVENTION

One objective of the present invention is to provide an LED lamp and an extendible component and heat dissipating base thereof.

Another objective of the present invention is to provide an LED wireless dimming system, which is capable of solving the problem of electromagnetic interference (EMI) with a smaller volume.

To solve the aforesaid problems, inductor elements are not required in the configuration of the driving circuit, and meanwhile, the problem of EMI is solved.

To solve the aforesaid technical problems, the present invention provides an LED lamp component, the LED lamp component comprises a heat dissipating base, a light emitting module and a lens, the heat dissipating base has a bearing surface and a back surface opposite to the bearing surface, the bearing surface is provided with a first recessed section therein, the back surface is provided with heat dissipating structures; the heat dissipating base further comprises a first joint portion; the light emitting module is disposed in the first recessed section, and the lens covers the light emitting module.

In an embodiment of the present invention, the first joint portion is disposed on the bearing surface, or disposed on a first side surface or a second side surface of the heat dissipating base that are opposite to each other, or disposed on one or more of the heat dissipating structures.

In an embodiment of the present invention, the heat dissipating base further has a second joint portion, and the second joint portion is disposed at a position that is the same as or different from the position where the first joint portion is disposed.

In an embodiment of the present invention, the heat dissipating base further comprises a plurality of second recessed sections, and the second recessed sections are disposed within the first recessed section.

In an embodiment of the present invention, at least a part of electronic elements of the light emitting module are accommodated within at least some of the plurality of second recessed sections.

In an embodiment of the present invention, the first joint portion is a convex portion and/or a concave portion.

In an embodiment of the present invention, the second joint portion is a protrusion or a recessed hole.

In an embodiment of the present invention, the heat dissipating structure comprises a plurality of fins or a plurality of metal columns, or a combination of metal columns and fins, and the fins are opposite and parallel to each other and are parallel to the first side surface and the second side surface of the heat dissipating base that are opposite to each other.

In an embodiment of the present invention, at least some of the plurality of second recessed sections have depths different from each other.

In an embodiment of the present invention, the light emitting module comprises a first LED lamp group, a second LED lamp group and a wireless dimming device, the wireless dimming device comprises a rectifying circuit, a high-voltage linear driving circuit, an inductorless driving circuit, an LED driving circuit and a wireless control circuit, and wherein: the rectifying circuit is connected to input terminals of the high-voltage linear driving circuit and the inductorless driving circuit respectively, and is configured to provide a suitable converted voltage to the high-voltage linear driving circuit and the inductorless driving circuit; an output terminal of the high-voltage linear driving circuit connects to the first LED lamp group; the inductorless driving circuit provides a first voltage and a second voltage, the first voltage is outputted to the wireless control circuit, and the second voltage is provided to an input terminal of the LED driving circuit; an output terminal of the LED driving circuit connects to the second LED lamp group; the wireless control circuit receives a wireless signal, and transmits a dimming signal to the high-voltage linear driving circuit and the LED driving circuit respectively so as to perform dimming control on the first LED lamp group and the second LED lamp group.

In an embodiment of the present invention, the first voltage is a constant voltage, and the second voltage is an adjustable voltage.

In an embodiment of the present invention, the first LED lamp group is a lamp group for main light, and the second LED lamp group is a lamp group for scene light.

The present invention further provides an LED lamp, which comprises one or more LED lamp components as described above.

In an embodiment of the present invention, the aforesaid LED lamp further comprises a first side cover and a second side cover which are combined with the heat dissipating base of the LED lamp component.

The present invention further provides a heat dissipating base of an LED lamp component, the heat dissipating base has a bearing surface and a back surface opposite to the bearing surface, the bearing surface is provided with a first recessed section therein, the back surface is provided with a plurality of heat dissipating structures, and the heat dissipating base further comprises a first joint portion.

In an embodiment of the present invention, the heat dissipating structures include a plurality of fins or a plurality of metal columns, or a combination of metal columns and fins, and the fins are opposite and parallel to each other and are parallel to a first side surface and a second side surface of the heat dissipating base that are opposite to each other.

In an embodiment of the present invention, the first joint portion is disposed on the bearing surface, or disposed on the first side surface or the second side surface of the heat dissipating base that are opposite to each other, or disposed on the heat dissipating structures.

In an embodiment of the present invention, the heat dissipating base further comprises a second joint portion, and the second joint portion is disposed at a position that is the same as or different from the position where the first joint portion is disposed.

In an embodiment of the present invention, at least a part of electronic elements of the light emitting module are accommodated within at least a part of the plurality of second recessed sections.

In an embodiment of the present invention, at least a part of the plurality of second recessed sections have depths different from each other.

The present invention further provides an LED wireless dimming system which is adapted to perform dimming on a first LED lamp group and a second LED lamp group respectively, the wireless dimming system comprises a rectifying circuit, a high-voltage linear driving circuit, an inductorless driving circuit, an LED driving circuit and a wireless control circuit, wherein: the rectifying circuit is connected to input terminals of the high-voltage linear driving circuit and the inductorless driving circuit respectively, and is configured to provide a suitable converted voltage to the high-voltage linear driving circuit and the inductorless driving circuit; an output terminal of the high-voltage linear driving circuit connects to the first LED lamp group; the inductorless driving circuit provides a first voltage and a second voltage, the first voltage is outputted to the wireless control circuit, and the second voltage is provided to an input terminal of the LED driving circuit; an output terminal of the LED driving circuit connects to the second LED lamp group; the wireless control circuit receives a wireless signal, and transmits a dimming signal to the high-voltage linear driving circuit and the LED driving circuit respectively so as to perform dimming control on the first LED lamp group and the second LED lamp group.

In an embodiment of the present invention, the first voltage is a constant voltage, and the second voltage is an adjustable voltage.

In an embodiment of the present invention, the first LED lamp group is a lamp group for main light, and the second LED lamp group is a lamp group for scene light.

As compared to the prior art, the present invention has many advantages. First, the LED lamp of the present disclosure may have arrangement like stacked building blocks, and LED lamp components and functional modules thereof can be extended simply depending on occasions and demands; second, the LED lamp component may be adapted to various light emitting modules having electronic elements of different heights through the design of the second recessed sections so that the LED lamp component has greater adaptability; and moreover, the present invention uses a conductorless driving circuit of a small volume, so the EMI suppression circuit can be avoided; and the conductorless driving circuit can provide both a constant voltage and an adjustable voltage, so it is suitable for various different LED applications.

DESCRIPTION OF THE PREFERRED EMBODIMENT

In order to make above objectives, features and advantages of the present invention clearer and easier to be understood, specific implementation of the present invention will be described in detail hereinafter with reference to attached drawings.

In order to fully understand the present invention, many specific details are described in the following description. However, the present invention may also be implemented in other manners different from those described herein, so the present invention is not limited by the specific embodiments disclosed hereinafter.

As shown in this application and the claims, terms "a/an", "one", "one kind of" and/or "the" are not intended to indicate singular forms particularly but also comprise plural forms, unless an exceptional circumstance is stated clearly in the context. Generally speaking, terms "comprising" and "including" only prompt that steps and elements clearly identified are included, but these steps and elements do not constitute an exclusive listing, and the method or apparatus may also comprise other steps or elements.

Embodiments of the present disclosure describe LED lamp components, which may be combined with each other by joining to each other. Moreover, in the structural design of the LED lamp component of the embodiments of the present disclosure, spaces for various parts are reserved in advance, so spaces required by circuit designs of various different solutions can be provided while specification design requirements for light, heat and safety regulation are satisfied. Moreover, the LED wireless dimming system in the LED lamp component of the embodiments of the present disclosure can reduce the volume of circuit modules so that the circuit modules can be installed into the LED lamp component more conveniently.

Figure 1:
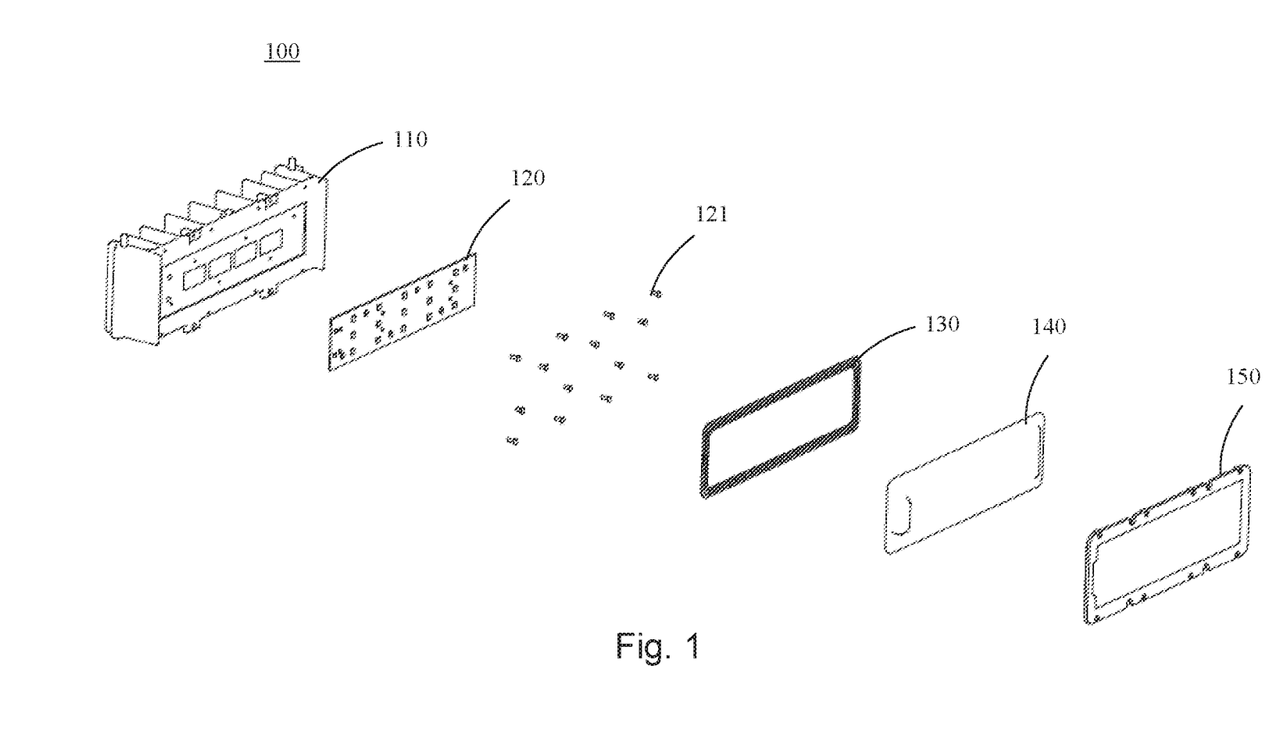
FIG. 1 is a perspective exploded view of an LED lamp component according to an embodiment of the present disclosure.

FIG. 1 is a perspective exploded view of an LED lamp component according to an embodiment of the present disclosure. Referring to FIG. 1, an LED lamp component 100 according to this embodiment may comprise a heat dissipating base 110, a light emitting module 120, a sealing washer 130, a lens 140, a cover plate 150 and a plurality of screws. In this embodiment, the light emitting module may use a Driver on Board (DoB) module, but it is not limited thereto. The light emitting module 120 may be a double-sided print circuit board assembly (PCBA), and a side thereof facing the lens 140 may be provided with a connector, a driver, and basic illumination elements such as an LED package array therein. The light emitting module 120 may also be provided with a smart module in which wireless communication protocols (e.g., Zigbee, Long Range Wide-area network, Bluetooth, WiFi or the like) are built, so a smart hand-held apparatus (e.g., a mobile phone or a tablet computer) can be used to control the LED lamp component 100, e.g., control the color temperature, the color, and the switch or the like of the LED lamp component 100. The light emitting module 120 may further comprise an invisible light module, e.g., an infrared module may be used for switch monitoring, and an ultraviolet (UV) module may be used for sterilization.

In this embodiment, the sealing washer 130 is for example an O-shaped ring, but it may also have other shapes. As shall be appreciated by those skilled in the art, the sealing washer 130 is not necessary, and the sealing washer 130 may be omitted in cases where a high tightness of the lamp is not required.

In other embodiments of the present invention, a plurality of LED packages may not be arranged into an LED package array but arranged in other manners. Alternatively, the number of the LED packages may also change, e.g., change into one. Each LED package may comprise one or more LED chips therein.

In the embodiments of the present invention, the illumination elements may emit common visible light, and may also emit invisible light, e.g., infrared light or ultraviolet light.

As shall be appreciated by those skilled in the art, the cover plate 150 is not necessary, and the cover plate 150 may be omitted when the LED lamp component has a sufficient strength, or other parts are disposed outside the LED lamp component for protection.

Figure 2A:
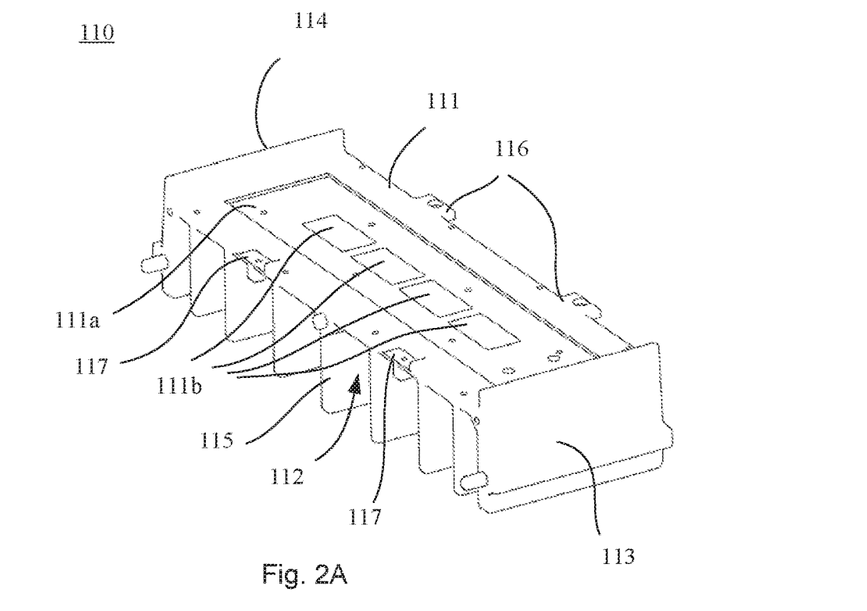
FIG. 2A and FIG. 2B are respectively a perspective view and a cross-sectional view of a heat dissipating base of an LED lamp component according to an embodiment of the present disclosure.
Figure 2B:
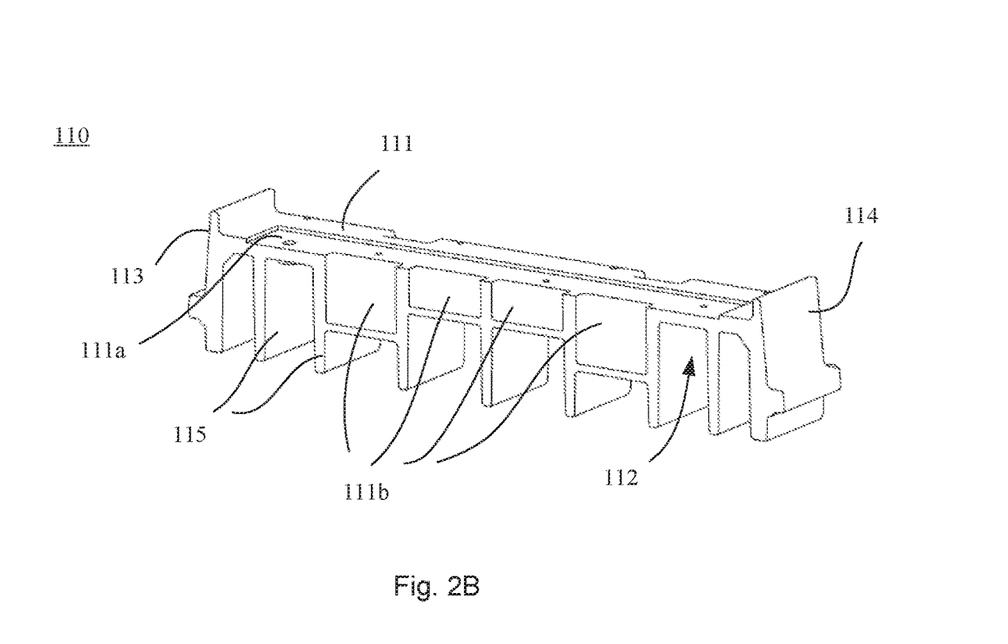

FIG. 2A and FIG. 2B are respectively a perspective view and a cross-sectional view of a heat dissipating base of an LED lamp component according to an embodiment of the present disclosure. Referring to FIG. 2A and FIG. 2B, the heat dissipating base 110 has a bearing surface 111, a back surface 112, a first side surface 113 and a second side surface 114. The back surface 112 is opposite to the bearing surface 111 and has a fin surface, and the fin surface comprises a plurality of fins 115 therein. The arrangement of the fins 115 may be determined depending on heat dissipating needs. For example, the fins 115 is opposite and parallel to each other, and meanwhile, the fins 115 are also parallel to the first side surface 113 and the second side surface 114. Additionally, the shapes of the fins 115 may also adopt various shapes of known heat dissipating fins.

The bearing surface 111 of the heat dissipating base 110 may comprise a first recessed section 111a and a plurality of second recessed sections 111b thereon, and the second recessed sections 111b may be disposed within the first recessed section. The light emitting module 120 may be disposed in the first recessed section 111a. The light emitting module 120 may be locked above the heat dissipating base 110 via screws for example, and the sealing washer 130, the lens 140, and the cover plate 150 are sequentially disposed on the periphery of the first recessed section 111a, and these members are attached and assembled into the lamp component 100 via several screws. In such a structure, the lens 140 covers the light emitting module 120, and the cover plate 150 covers around the lens 140 so as to fix the lens 140.

As described above, the bearing surface 111 of the heat dissipating base 110 has a plurality of second recessed sections 111b, and these second recessed sections 111b are a sealed structure, and the depths and the volumes of the second recessed sections may be different from each other. These second recessed sections 111b are used to accommodate elements of the light emitting module 120 that are located on the surface facing the heat dissipating base 110 (i.e., on the back surface of the light emitting module). Therefore, the size of the second recessed sections 111b will be adjusted correspondingly in consideration of the electronic elements disposed on the light emitting module 120.

Taking FIG. 2B as an example, the second recessed sections 111b comprise two sets of recessed sections having different depths, and the two sets of recessed sections may have same opening sizes. The recessed sections having a smaller depth may be adjacent to each other, and the recessed sections having a larger depth are adjacent to the recessed sections having a smaller depth, but the recessed sections having a larger depth are not adjacent to each other. In this way, the recessed sections having a larger depth may be used to accommodate larger electronic elements (e.g., a capacitor, a rheostat or the like) in the light emitting module 120, and can effectively reduce the effect of EMI. It shall be appreciated that, when the conventional arrangement of the electronic elements on the back surface of the light emitting module 120 varies, the depth configuration of the second recessed sections 111b also varies accordingly so as to accommodate to the light emitting module 120. Smaller electronic elements on the back surface of the light emitting module 120 only need to be accommodated in the first recessed section 111a and do not need to be accommodated in the second recessed sections 111b.

The LED lamp component may be adapted to various light emitting modules 120 having electronic elements of different heights through the design of the second recessed sections 111b so that the LED lamp component has greater adaptability.

When the electronic elements are disposed within the second recessed sections 111b, the second recessed sections 111b may be further filled with different materials (e.g., aluminum alloys or thermally conductive plastics) to improve safety specifications or requirements of heat conduction, in order to facilitate heat dissipation or satisfy safety specifications.

Figure 3:
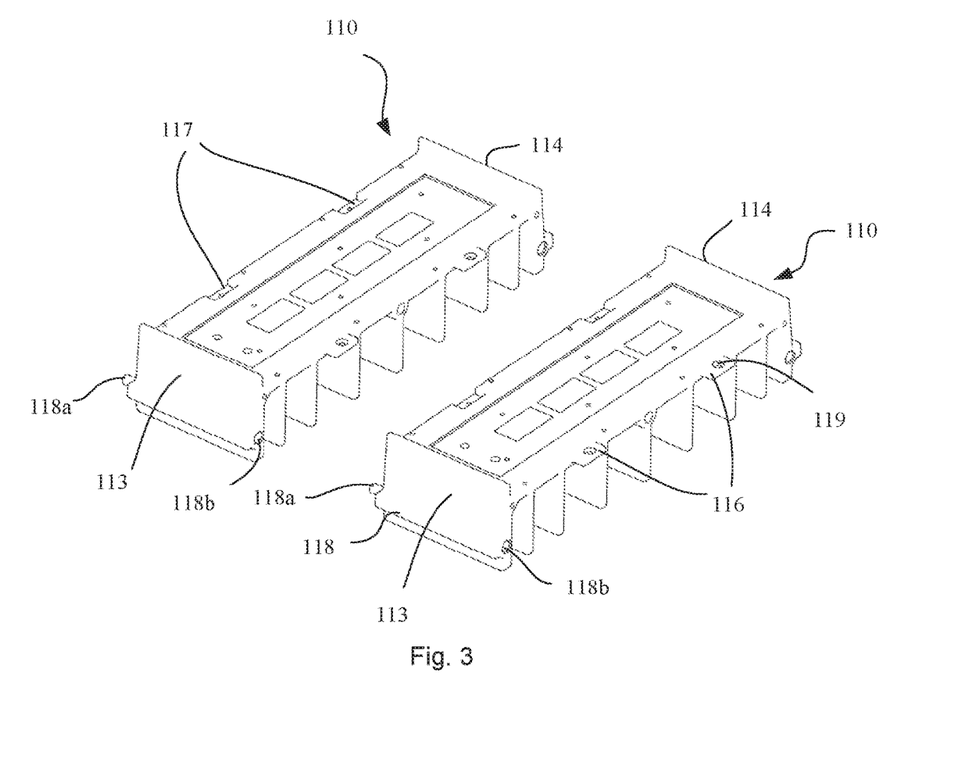
FIG. 3 is a schematic view illustrating the joining of two heat dissipating bases of LED lamp components according to an embodiment of the present disclosure.

The LED lamp component 100 of this embodiment alone may constitute one LED lamp, or a plurality of LED lamp components 100 are joined together to constitute one LED lamp. The lamp components 100 may be connected with each other via structures on the heat dissipating bases 110, as shown in FIG. 3. The heat dissipating base 110 of each of the lamp components 100 may be provided with a first joint portion, through which the lamp components are joined with each other. The first joint portion may be disposed on the bearing surface 111 of the heat dissipating base 110, or disposed on the first side surface 113 or the second side surface 114 of the heat dissipating base 110 that are opposite to each other, or disposed on one or more fins 115 or the like. For example, in examples of FIG. 2A and FIG. 2B, a convex portion 116 and a concave portion 117 may be designed at two external sides of the bearing surface 111 of the heat dissipating base 110, and the convex portion 116 and the concave portion 117 may be disposed at different sides respectively (as shown in FIG. 2A and FIG. 2B) or may be designed at the same side (not shown). The heat dissipating base 110 of each of the lamp components 100 may be further provided with a second joint portion to increase the joining strength. The second joint portion may be disposed at a position that is the same as or different from the position where the first joint portion is disposed. For example, Referring to FIG. 3, each of the first side surface 113 and the second side surface 114 of the heat dissipating base 110 may comprise a protruding portion 118, two ends of the protruding portion 118 are provided with a protrusion 118a and a recessed hole 118b respectively, and the protrusion 118a and the recessed hole 118b can also be designed to be engaged with each other so that the heat dissipating bases 110 are allowed to be joined together via the protrusions 118a and the recessed holes 118b.

Accordingly, the heat dissipating bases of any two lamp components can be engaged with each other via the convex portion 116 and the concave portion 117 as well as the protrusion 118a and the recessed hole 118 described above. A keyhole 119 may be further provided within the convex portion 116 and the concave portion 117, and the keyhole 119 is locked with a screw to enhance the connection between the convex portion 116 and the concave portion 117. Not only relevant mortise-and-tenon type structures may be provided on the bearing surface 111 or the left side surface 113 and the right side surface 114 of the heat dissipating base 110 to fix the LED lamp component, the same structures may also be disposed on one or more fins 115 of the heat dissipating base 110 to enhance the effect of fixing the LED units of the lamp. For example, in the present embodiment, protrusions and recessed holes are further provided in the fins 115, so the effect of fixing different LED units of the lamp may also be enhanced through the protrusions and recessed holes in the heat dissipating fins.

In alternative embodiments of the present disclosure, the aforesaid light emitting module 120 may also be replaced with other illumination modules having different brightness, different light forms (e.g., providing more focused or diffused light or the like) and different color temperatures (e.g., warm color temperatures closer to red and yellow, or cool color temperature closer to blue and green), or light emitting modules that are capable of emitting invisible light (e.g., infrared light or ultraviolet light). By loading different functional modules in different lamp components in this embodiment, the lamp components of the present embodiment not only can achieve the purpose of illumination, but also can achieve the purposes of network communication or detection for other substances by replacing or extending functional modules in the lamp components as needed.

Figure 4:
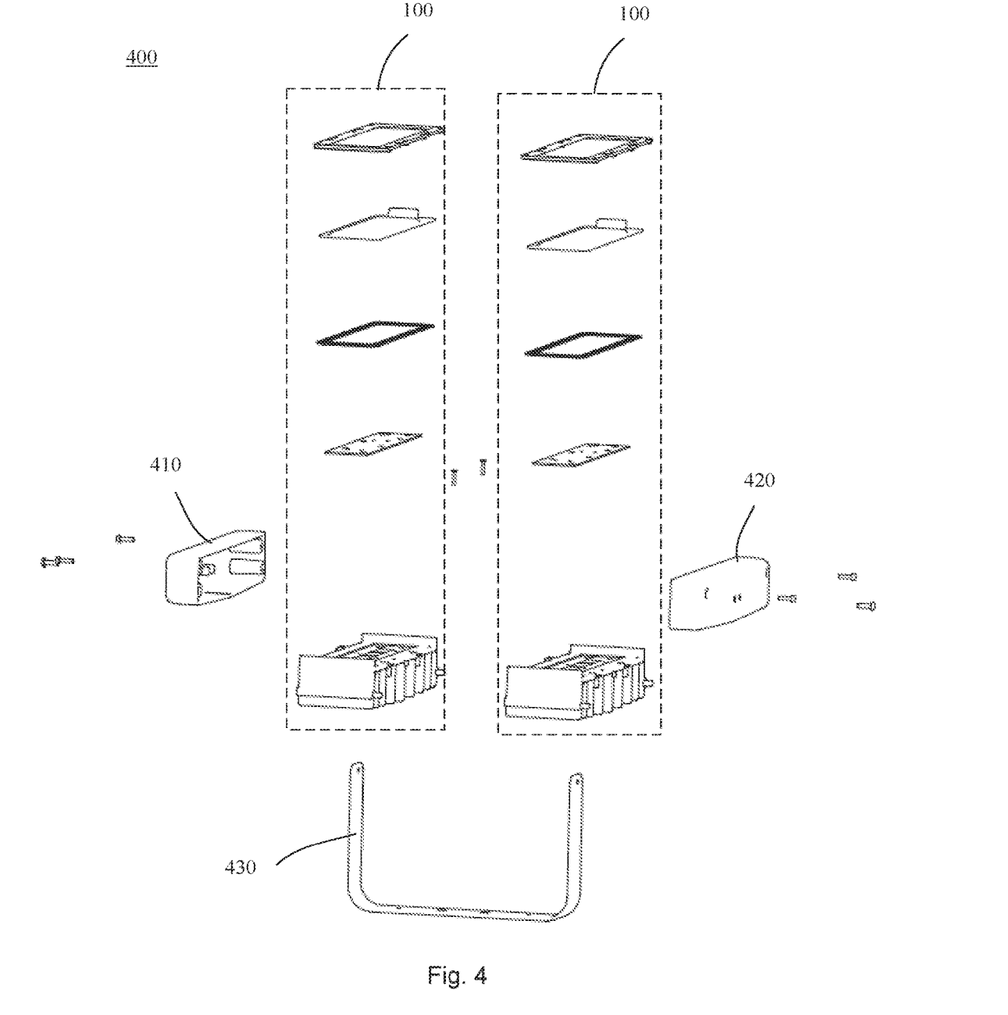
FIG. 4 is a perspective exploded view of an LED lamp according to an embodiment of the present disclosure.
Figure 5:
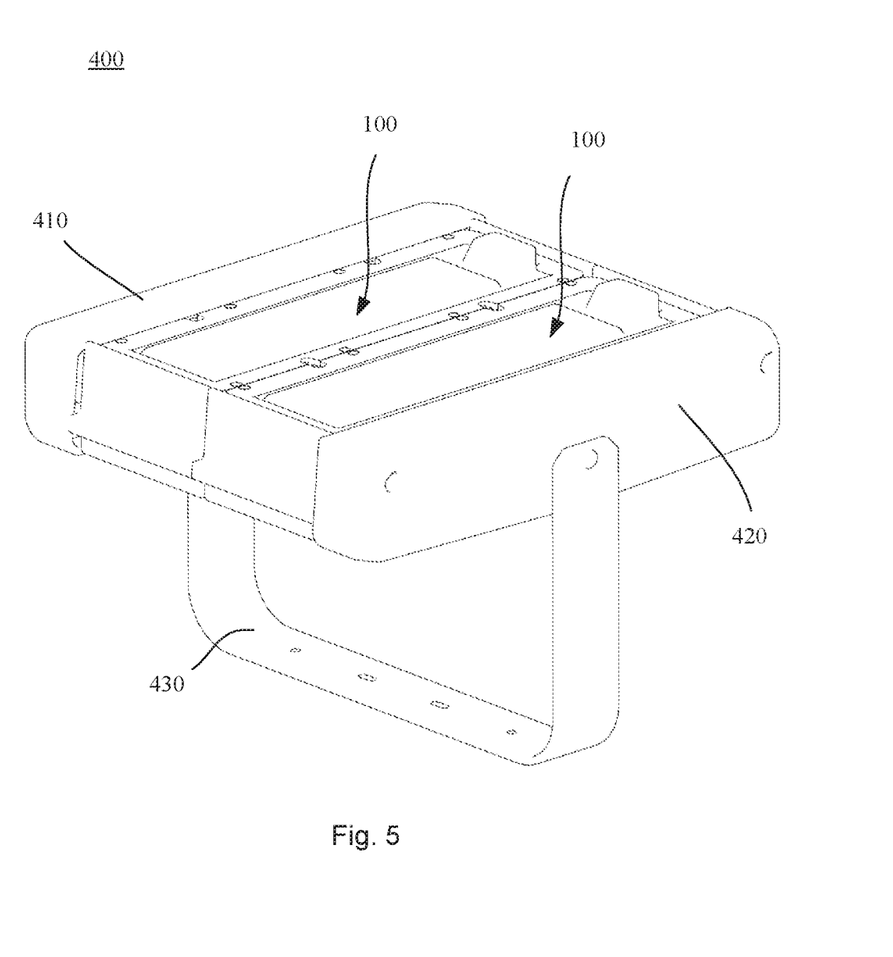
FIG. 5 is a schematic view of an LED lamp according to an embodiment of the present invention.

FIG. 4 is a perspective exploded view of an LED lamp according to an embodiment of the present disclosure. FIG. 5 is a schematic view of an LED lamp according to an embodiment of the present invention. Referring to FIG. 4 and FIG. 5, an LED lamp 400 of this embodiment comprises at least one LED lamp component 100 described above (two LED lamp components are shown in the figures), a left side cover 410 and a right side cover 420. Each of the left side cover 410 and the right side cover 420 may be provided with a corresponding protrusion or recessed hole (not shown) at a side thereof connected with the at least one lamp component 100 for engagement with the at least one LED lamp component 100, and the engagement may be further enhanced by locking with a screw. The lamp component and the left and right side covers assembled together form one most basic LED lamp assembly. A receiving space may be further formed in the left and right side covers 410 and 420, and a module, e.g., an infrared module, may be received in the receiving space to detect temperature and humidity or PM 2.5 (not shown).

For the LED lamp assembly of the present embodiment, the LED lamp components are connected for example in parallel or in series, and the LEDs in each of the LED lamp components may be in an array and connected with each other.

A holder may be further attached to external sides of the left side cover 410 and the right side cover 420 in the assembled LED lamp assembly to form a complete LED lamp 400. The number of lamp components in the LED lamp assembly may be extended or reduced depending on application occasions and the LED lamp assembly may be combined with basic architectures of lamps current available.

Figure 6:
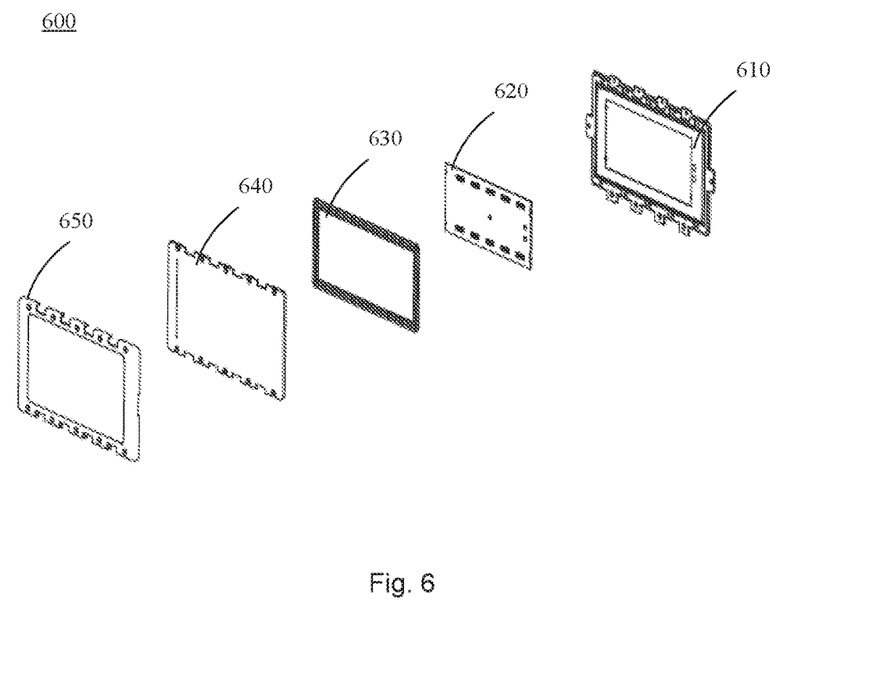
FIG. 6 is a perspective exploded view of an LED lamp component according to another embodiment of the present disclosure.

FIG. 6 is a perspective exploded view of an LED lamp component according to another embodiment of the present disclosure. Referring to FIG. 6, an LED lamp component 600 according to this embodiment may comprise a heat dissipating base 610, a light emitting module 620, a sealing washer 630, a lens 640, a cover plate 650 and a plurality of screws. This embodiment differs from the previous embodiment in that: the heat dissipating base 610 of this embodiment has a thinner structure, so the second recessed section is unnecessary.

Figure 7A:
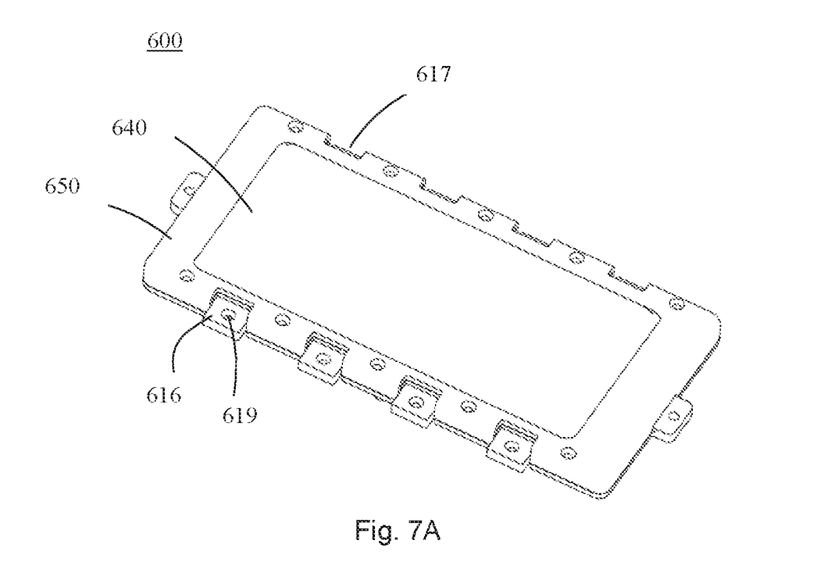
FIG. 7A and FIG. 7B are assembled views of an LED lamp component according to another embodiment of the present disclosure.
Figure 7B:
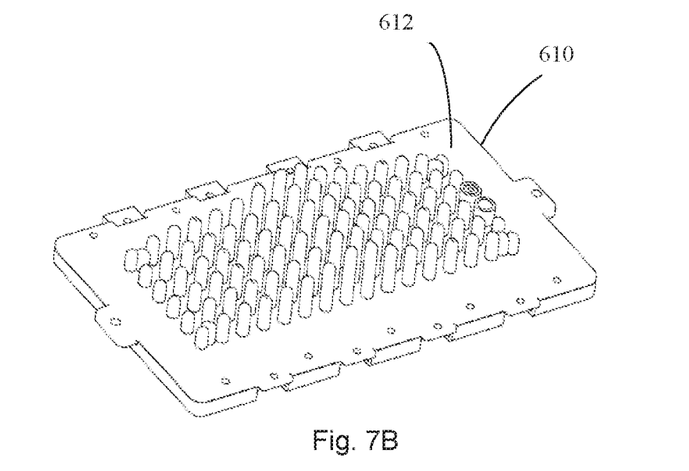

FIG. 7A and FIG. 7B are assembled views of an LED lamp component according to another embodiment of the present disclosure. Referring to FIG. 7A, the LED lamp component 600 after being assembled has a small thickness so that the volume of the lamp may be reduced. Additionally, protruding metal columns may be arranged on the back surface 612 of the heat dissipating base 610, and the number, positions and lengths of the metal columns may vary as needed. The metal columns can increase the heat dissipating area to improve the heat dissipating efficiency. Therefore, the metal columns are a kind of heat dissipating structures having the same functions as the fins 115 of FIG. 2A, so the metal columns on the back surface 612 of the heat dissipating base 610 may also be replaced with fins.

Figure 8:
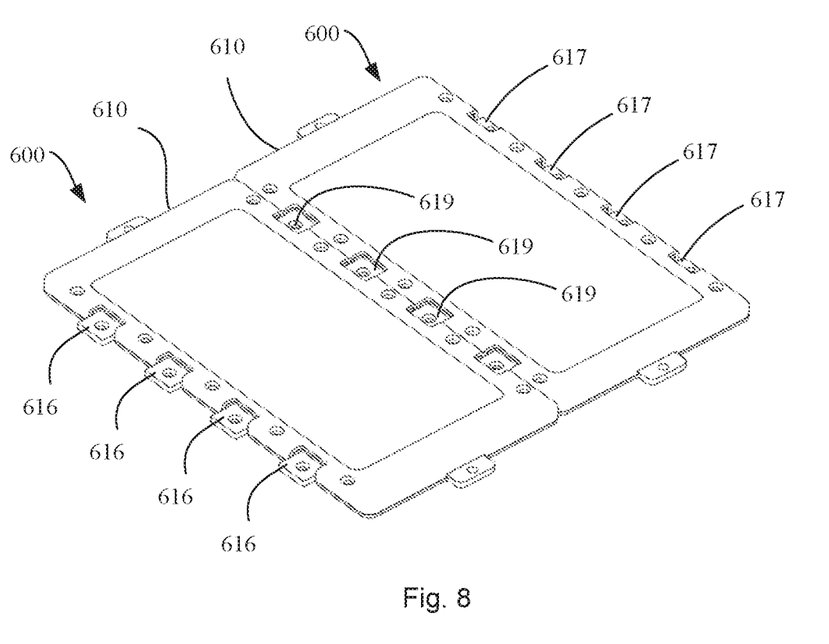
FIG. 8 is a schematic view illustrating the joining of two LED lamps according to another embodiment of the present disclosure.

The LED lamp component 600 of this embodiment may by itself constitute one LED lamp, or a plurality of LED lamp components 600 are joined together to constitute one LED lamp. The lamp components 600 may be connected with each other via structures on the heat dissipating bases 610, as shown in FIG. 8. The heat dissipating base 610 of each of the lamp components 600 may be provided with a first joint portion, through which the lamp components are joined with each other. The first joint portion may be disposed on the bearing surface (not shown) of the heat dissipating base 610. For example, in examples of FIG. 7A and FIG. 7B, a convex portion 616 and a concave portion 617 may be designed at two external sides of the bearing surface of the heat dissipating base 610, and the convex portion 616 and the concave portion 617 may be disposed at different sides respectively (as shown in FIG. 7A and FIG. 7B) or may be designed at the same side (not shown). Accordingly, the heat dissipating bases 610 of any two lamp components can be engaged with each other via the convex portion 616 and the concave portion 617 described above. A keyhole 619 may be further provided within the convex portion 616 and the concave portion 617, and the keyhole 619 is locked with a screw to enhance the connection between the convex portion 616 and the concave portion 617.

Accordingly, the LED lamp of the present disclosure may have arrangement like stacked building blocks, and LED lamp components and functional modules thereof can be extended simply depending on occasions and demands. In this way, according to the concept of Plug and Play (PnP), users can improve the economic benefits of the LED lamps and combine the LED lamps with future tendency of Internet of Things (IOT) by extending the lamps with new functions without the need of purchasing and changing whole sets of lamps.

Figure 9:
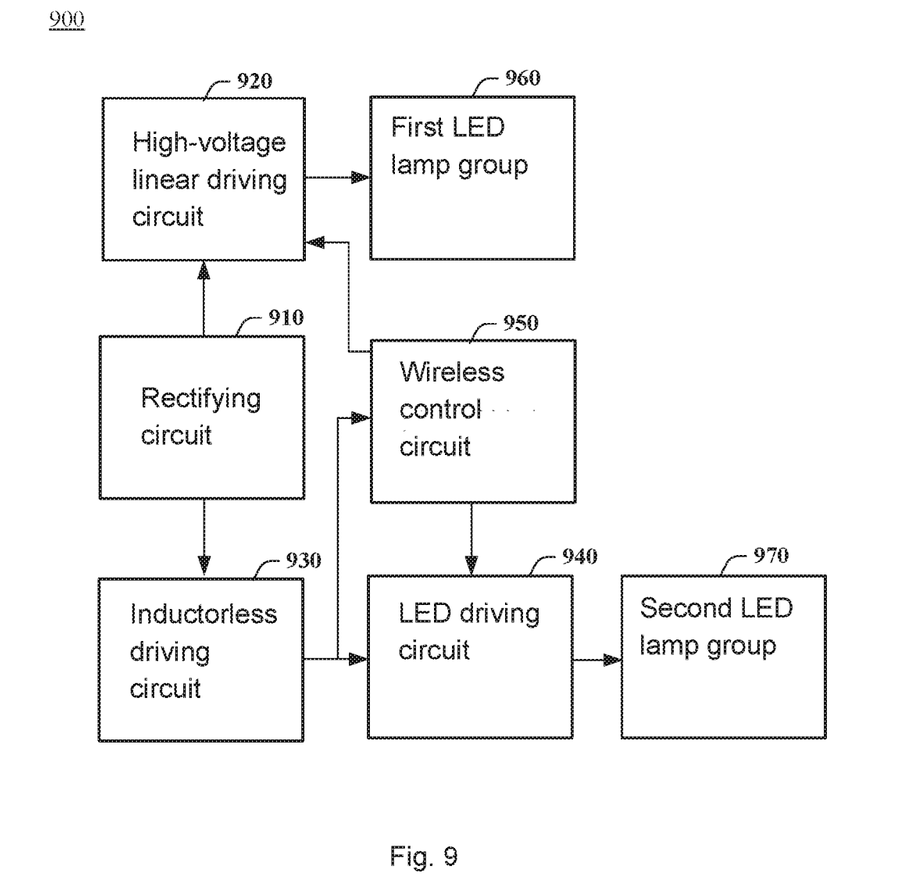
FIG. 9 is an electrical block diagram of an LED wireless dimming system according to an embodiment of the present disclosure.

FIG. 9 is an electrical block diagram of an LED wireless dimming system according to an embodiment of the present disclosure. Referring to FIG. 9, an LED wireless dimming system 900 of the present disclosure comprises a rectifying circuit 910, a high-voltage linear driving circuit 920, an inductorless driving circuit 930, an LED driving circuit 940 and a wireless control circuit 950. The rectifying circuit 910 may be connected for example with electric supply to convert the voltage of the electric supply to a voltage suitable to the subsequent circuit. The rectifying circuit 910 may be connected to input terminals of the high-voltage linear driving circuit 920 and the inductorless driving circuit 930 respectively, and is configured to provide a suitable converted voltage to the high-voltage linear driving circuit 920 and the inductorless driving circuit 930. An output terminal of the high-voltage linear driving circuit 920 connects to the first LED lamp group 960. The inductorless driving circuit 930 may provide two sets of output voltages: one set is a constant voltage and the other set is an adjustable voltage. The constant voltage is a low voltage and is provided to the wireless control circuit 950 of low power consumption, and the adjustable voltage is provided to the input terminal of the LED driving circuit 940. An output terminal of the LED driving circuit 940 connects to the second LED lamp group 970. The wireless control circuit 950 may receive a signal from a wireless apparatus such as a mobile phone or a tablet computer via a wireless communication protocol, and transmit a signal (e.g., a dimming signal) to the high-voltage linear driving circuit 920 and the LED driving circuit 940 respectively so as to perform dimming control on the first LED lamp group 960 and the second LED lamp group 970.

A signal output terminal of the wireless control circuit 950 is connected to the high-voltage linear driving circuit 920 and the LED driving circuit 940 respectively so that the brightness of the first LED lamp group 960 and the second LED lamp group 970 can be wirelessly adjusted through the signal wire of the wireless control circuit 950.

Although the two sets of output voltages provided by the inductorless driving circuit 930 are illustrated as comprising one set of constant voltage and another set of adjustable voltage in the above descriptions, it shall be appreciated that, the forms of the two sets of output voltages are determined depending on demands of the wireless control circuit 950 and the LED driving circuit 940 and thus are variable.

The constant voltage provided by the inductorless driving circuit 930 is preferably 3.3 V, and it may be mainly provided to the wireless control circuit 940 of low power consumption. The adjustable voltage provided by the inductorless driving circuit 930 preferably ranges from 9 V to 50 V and may be adjusted depending on demands of the subsequent circuit, and it may be mainly provided to the high-voltage linear driving circuit 920.

The inductorless driving circuit 930 is preferably an inductorless driving chip, and the EMI suppression circuit can be avoided because the inductorless driving chip has a small volume. Moreover, the conductorless driving chip can provide both a constant voltage and an adjustable voltage, so it is suitable for various different LED applications.

In the wireless control circuit 950, wireless communication protocols such as WIFI, Zigbee, Bluetooth or Bluetooth Low Energy may be preferably used, but not limited thereto.

In the embodiment of the present disclosure, the first LED lamp group 960 is for example a lamp group for main light, and the second LED lamp group 970 is for example a lamp group for scene light. The lamp group for main light is powered by the high-voltage linear driving circuit 920. The lamp group for scene light is powered by the LED driving circuit 940. The lamp group for main light is preferably a white LED light. The lamp group for scene light is preferably a combination of red, green and blue LED lights.

Moreover, in order to achieve the function of providing scene light in the wireless dimming system, different circuits need to be configured for powers of LEDs emitting light of different colors. For example, the white light serving as the main light source has a larger power (e.g., 8 W), the RGB primary lights serving as the scene light source have a smaller power (e.g., 1.5 W), and the wireless modules of low power consumption need to be driven by a low voltage.

The LED wireless dimming system of this embodiment utilizes the inductorless driving circuit to drive the wireless control circuit and the LED driving circuit, so dimming operations can be performed on the LED lights by using apparatuses (e.g., a mobile phone, a tablet computer or the like) having wireless communication protocols such as WIFI, Zigbee, Bluetooth or Bluetooth Low Energy or the like. Meanwhile, the volume of the whole system can be reduced and the EMI can also be reduced.

Although the present invention has been described with reference to current specific embodiments, those of ordinary skill in the art shall recognize that these embodiments are only used for illustration, and a variety of equivalent modifications or replacements may be made without departing from the sprit of the present invention. Therefore, modifications and variations for the above embodiments within the scope of the actual spirit of the present invention shall all fall within the scope of the claims of this application.

What is claimed is:

1. An LED lamp component, comprising a heat dissipating base, a light emitting module and a lens, the heat dissipating base comprising a bearing surface and a back surface opposite to the bearing surface, the bearing surface having a first recessed section, the back surface having heat dissipating structures, and the heat dissipating base further comprising a first joint portion; and the light emitting module being disposed in the first recessed section, and the lens covering the light emitting module;

wherein the light emitting module comprises a first LED lamp group, a second LED lamp group and a wireless dimming device, the wireless dimming device comprises a rectifying circuit, a high-voltage linear driving circuit, an inductorless driving circuit, an LED driving circuit and a wireless control circuit, and wherein:

the rectifying circuit is connected to an input terminals of the high-voltage linear driving circuit and an input terminals of the inductorless driving circuit, and the rectifying circuit is configured to provide a converted voltage to the high-voltage linear driving circuit and the inductorless driving circuit;

an output terminal of the high-voltage linear driving circuit is connected to the first LED lamp group;

the inductorless driving circuit provides a first voltage and a second voltage, the first voltage is provided to the wireless control circuit, and the second voltage is provided to an input terminal of the LED driving circuit;

an output terminal of the LED driving circuit is connected to the second LED lamp group;

the wireless control circuit receives a wireless signal, and transmits a dimming signal to the high-voltage linear driving circuit and the LED driving circuit to perform dimming control on the first LED lamp group and the second LED lamp group.

2. The LED lamp component of claim 1, wherein the first joint portion is disposed on the bearing surface, or disposed on a first side surface or a second side surface of the heat dissipating base that are opposite to each other, or disposed on one or more of the heat dissipating structures.

3. The LED lamp component of claim 1, wherein the heat dissipating base further comprises a second joint portion, and the second joint portion is disposed at a position that is the same as or different from the position where the first joint portion is disposed.

4. The LED lamp component of claim 3, wherein the second joint portion is a protrusion or a recessed hole.

5. The LED lamp component of claim 1, wherein the heat dissipating base further comprises a plurality of second recessed sections, and the second recessed sections are disposed within the first recessed section.

6. The LED lamp component of claim 5, wherein at least a part of electronic elements of the light emitting module are accommodated within at least some of the plurality of second recessed sections.

7. The LED lamp component of claim 1, wherein the first joint portion is a convex portion and/or a concave portion.

8. The LED lamp component of claim 1, wherein the heat dissipating structure comprises one of: a plurality of fins, or a plurality of metal columns, or a combination of metal columns and fins, wherein when the heat dissipating structure comprises a plurality of fins or a combination of metal columns and fins, the fins are opposite and parallel to each other and are parallel to a first side surface and a second side surface of the heat dissipating base that are opposite to each other.

9. The LED lamp component of claim 1, wherein at least some of the plurality of second recessed sections have different depths.

10. The LED lamp component of claim 1, wherein the first voltage is a constant voltage, and the second voltage is an adjustable voltage.

11. The LED lamp component of claim 1, wherein the first LED lamp group is a lamp group for main light, and the second LED lamp group is a lamp group for scene light.

12. An LED lamp, comprising one or more LED lamp components of claim 1.

13. The LED lamp of claim 12, further comprising a first side cover and a second side cover which are combined with the heat dissipating base of the LED lamp component.

14. An LED wireless dimming system for dimming a first LED lamp group and a second LED lamp group, the LED wireless dimming system comprising a rectifying circuit, a high-voltage linear driving circuit, an inductorless driving circuit, an LED driving circuit and a wireless control circuit, wherein:

the rectifying circuit is connected to an input terminals of the high-voltage linear driving circuit and an input terminals of the inductorless driving circuit, and is configured to provide a converted voltage to the high-voltage linear driving circuit and the inductorless driving circuit;

an output terminal of the high-voltage linear driving circuit is connected to the first LED lamp group;

the inductorless driving circuit provides a first voltage and a second voltage, the first voltage is outputted to the wireless control circuit, and the second voltage is provided to an input terminal of the LED driving circuit;

an output terminal of the LED driving circuit is connected to the second LED lamp group;

the wireless control circuit receives a wireless signal, and transmits a dimming signal to the high-voltage linear driving circuit and the LED driving circuit to perform dimming control on the first LED lamp group and the second LED lamp group.

15. The LED wireless dimming system of claim 14, wherein the first voltage is a constant voltage, and the second voltage is an adjustable voltage.

16. The LED wireless dimming system of claim 14, wherein the first LED lamp group is a lamp group for main light, and the second LED lamp group is a lamp group for scene light.

* * * * *